US012642731B2

(12) United States Patent
Akbery

(10) Patent No.: US 12,642,731 B2
(45) Date of Patent: Jun. 2, 2026

(54) APPARATUS FOR SPINAL SEGMENTATION

(71) Applicant: BHM IP Pty. Ltd., Red Hill QLD (AU)

(72) Inventor: Khaled Akbery, Red Hill (AU)

(73) Assignee: BHM IP Pty. Ltd., Red Hill QLD (AU)

( * ) Notice: Subject to any disclaimer, the term of this patent is extended or adjusted under 35 U.S.C. 154(b) by 17 days.

(21) Appl. No.: 18/700,242

(22) PCT Filed: Oct. 11, 2022

(86) PCT No.: PCT/AU2022/051219

§ 371 (c)(1),
(2) Date: Apr. 10, 2024

(87) PCT Pub. No.: WO2023/060300

PCT Pub. Date: Apr. 20, 2023

(65) Prior Publication Data

US 2025/0221877 A1 Jul. 10, 2025

(30) Foreign Application Priority Data

Oct. 11, 2021 (AU) ................................ 2021903251

(51) Int. Cl.
*A61H 1/02* (2006.01)

(52) U.S. Cl.
CPC ... *A61H 1/0292* (2013.01); *A61H 2201/1671* (2013.01); *A61H 2201/1676* (2013.01)

(58) Field of Classification Search
CPC ............ A41D 13/0531; A41D 13/0512; A61H 2205/081; A61H 2201/165;

(Continued)

(56) References Cited

U.S. PATENT DOCUMENTS 6,071,257 A * 6/2000 Stojanovic ......... A41D 13/0531 128/845
9,573,040 B1 2/2017 Metz et al.
(Continued)

FOREIGN PATENT DOCUMENTS

EP 2974709 A1 1/2016
KR 20100011036 U 11/2010

OTHER PUBLICATIONS

International Search Report and Written Opinion for PCT/AU2022/051219, mailed Feb. 7, 2023 (in 12 pages).

(Continued)

*Primary Examiner* — Ophelia A Hawthorne
(74) *Attorney, Agent, or Firm* — Knobbe, Martens, Olson & Bear, LLP

(57) ABSTRACT

An apparatus for spinal segmentation of a user's spine, the apparatus including: a board assembly having a length extending between two ends and including a plurality of independently movable back supporting members arranged transversely across the length, each back supporting member being positioned for receiving separate regions of the user's lumbar region during use; each back supporting member being operatively linked with a corresponding underlying tactile member located along an underside portion of the back supporting member such that when a pushing force is applied by the user's lumbar region on one or more of the back supporting members, movement of the supporting member from an initial raised configuration to a lowered configuration occurs, wherein the movement results in a first clicking sound emitted by the underlying tactile member.

15 Claims, 8 Drawing Sheets

(58) Field of Classification Search
CPC ........ A61B 17/7062; A61F 5/02; A61F 5/022; A61F 5/026; A61F 5/024; A61F 5/028; A61F 5/03; F41H 1/02
See application file for complete search history.

(56) References Cited

U.S. PATENT DOCUMENTS

| | | | |
|---|---|---|---|
| 2010/0048365 | A1 | 2/2010 | Hudswell et al. |
| 2015/0272808 | A1 | 10/2015 | Lee |
| 2017/0225031 | A1 | 8/2017 | James |

OTHER PUBLICATIONS

International Preliminary Report On Patentability for PCT/AU2022/051219, mailed Aug. 28, 2023 (in 6 pages).

* cited by examiner

APPARATUS FOR SPINAL SEGMENTATION

TECHNICAL FIELD

The present invention relates to an apparatus for improving the posture of a patient by aligning the user's spine into a neutral position.

BACKGROUND

Any references to methods, apparatus or documents of the prior art are not to be taken as constituting any evidence or admission that they formed, or form part of the common general knowledge.

Spinal segmentation plays an important role in maintaining spinal health. In simple terms, spinal segmentation implies the ability of a person to create movement in each of the 24 vertebrae in a user's lumbar, thoracic and cervical spine. Poor posture, jobs that require static or repetitive movement, lack of exercise, over exercise and incorrect exercising, accident and surgery are common causes of muscle imbalances and dural tightness which can lead to poor spinal health. It is therefore desirable to provide exercise aids for improving a person's spinal health by promoting spinal segmentation.

SUMMARY OF INVENTION

In an aspect, the invention provides an apparatus for spinal segmentation of a user's spine, the apparatus comprising:

a board assembly having a length extending between two ends and comprising a plurality of independently movable back supporting members arranged transversely across the length, each back supporting member being positioned for receiving separate regions of the user's lumbar region during use;

each back supporting member being operatively linked with a corresponding underlying tactile member located along an underside portion of said back supporting member such that a pushing force applied by the user's lumbar region on one or more of the back supporting members results in movement of said supporting member from an initial raised configuration to a lowered configuration wherein the movement results in a first clicking sound emitted by the underlying tactile member.

In an embodiment, each of the back supporting members is resiliently biased by a biasing arrangement to return to the initial raised configuration when the pushing force is withdrawn.

In an embodiment, the biased movement of the back supporting member from the lowered configuration to the initial configuration results in a second clicking sound emitted by the underlying tactile member.

In an embodiment, the board assembly comprises a first end member positioned at the first end and a second end member positioned at the second end with the plurality of back supporting members being positioned in between the first and second end members.

In an embodiment, the apparatus further comprises at least two spaced apart frame members, each frame member being substantially elongate and extending between the first end member and the second end member wherein the back supporting members are mounted upon and across the spaced apart frame members.

In an embodiment, each back supporting member at a first end is rotatably mounted relative to one of the frame members and at the second end the back supporting member can be moved between the initial raised configuration and the lowered configuration upon receiving a pushing force applied by the user's lumbar region to move the second end of the back supporting member towards the second frame member as the back supporting member is lowered.

In an embodiment, the underlying tactile member comprises a tactile dome portion operatively linked with a dome engagement member positioned below the tactile dome portion whereby movement from the initial configuration to the lowered configuration results in separation between the tactile dome portion and the dome engagement member resulting in the dome portion being moved accompanied by a clicking sound.

In an embodiment, the dome engagement member comprises a hollow configuration allow the clicking sound emitted by the tactile dome portion to be reflected towards the user.

In an embodiment, the tactile member comprises a thin metallic foil with the tactile dome portion being embossed into the metallic foil.

In an embodiment, each of the back supporting members comprises a lumbar receiving surface extending between the two ends of the back supporting member and wherein the lumbar supporting surface comprises a raised profile along a central location between the two ends of the back supporting member.

In an embodiment, the board assembly comprises twelve back supporting members and wherein each back supporting member is positioned to be substantially aligned with the user's vertebrae in the user's back region during use.

In an embodiment, each back supporting member comprises a downwardly dependent side wall extending from the lumbar receiving surface wherein the side wall comprises visual indicia to indicate relative movement between the independently movable lumbar supporting regions.

In an embodiment, a side wall depending from the second end of the back supporting member comprises said visual indica.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
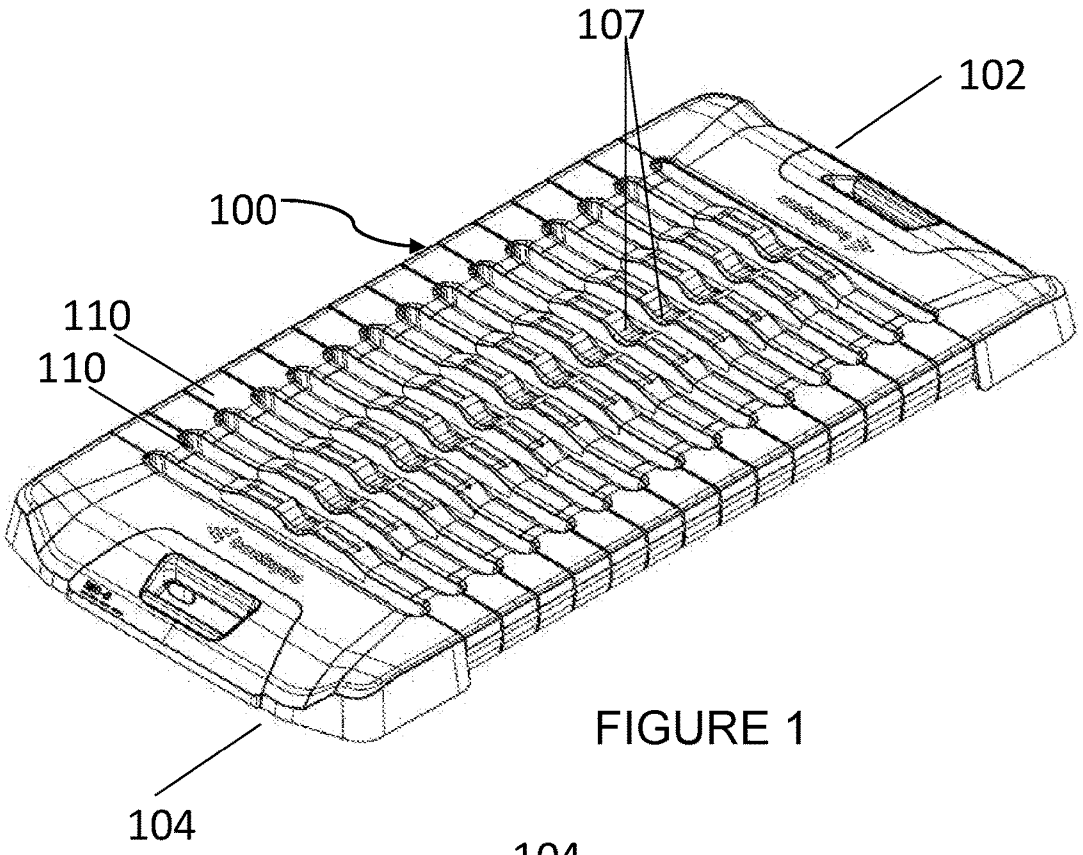
FIG. 1 is a top perspective view of the spinal segmentation board assembly 100 in accordance with an embodiment.
Figure 2:
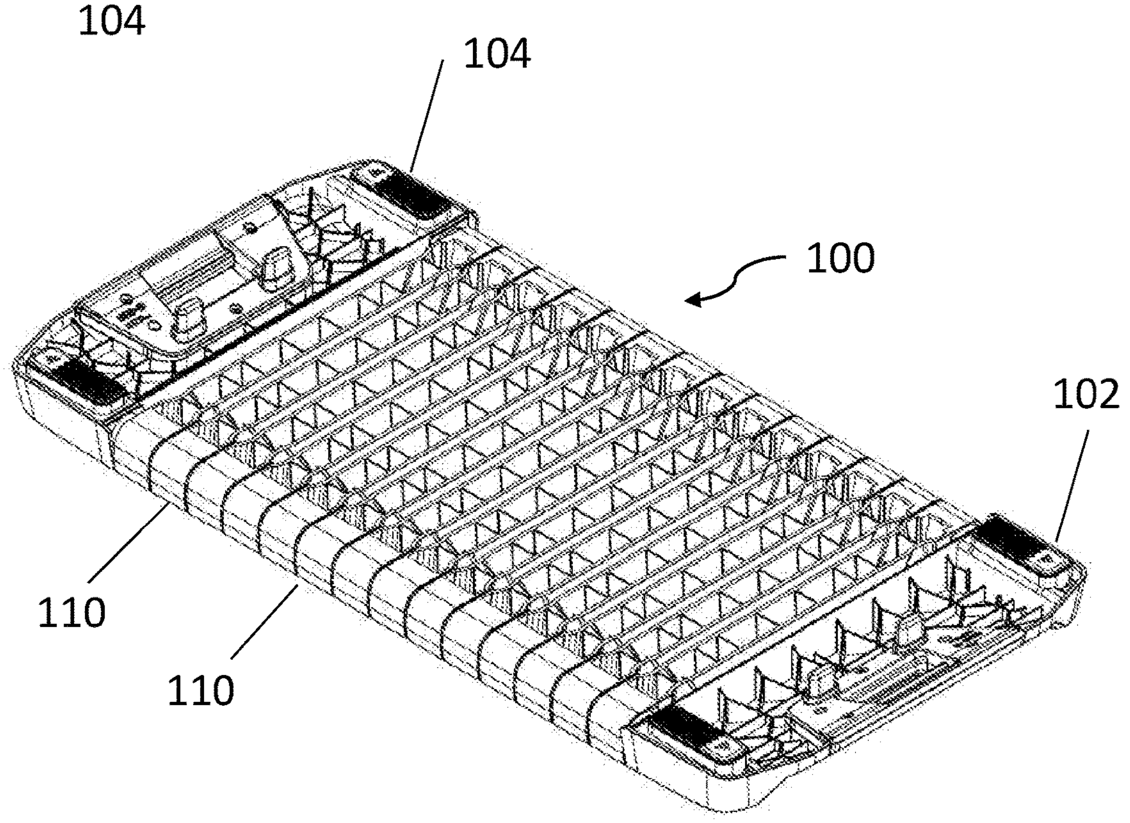
FIG. 2 is an underside view of the spinal segmentation board assembly 100.
Figure 3:
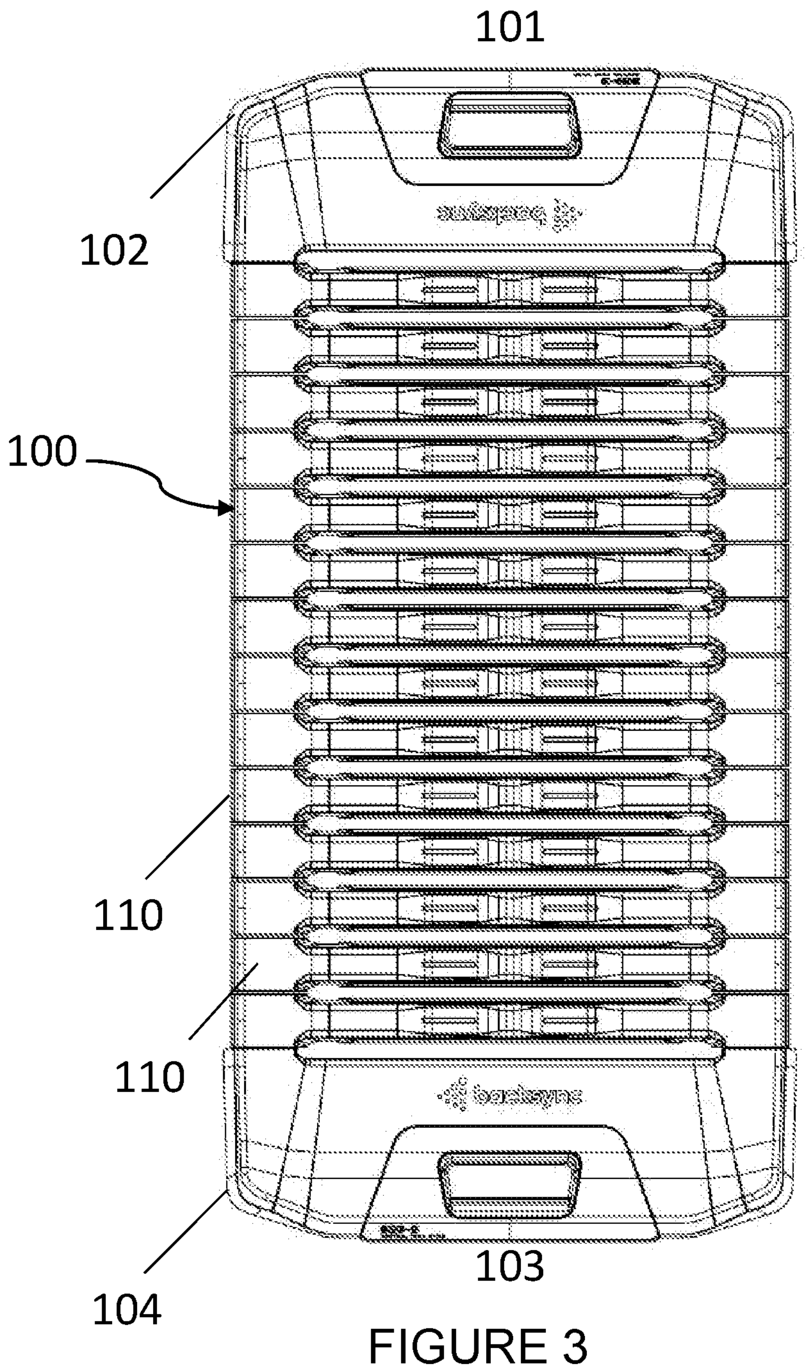
FIG. 3 is a top view of the spinal segmentation board assembly 100.
Figure 4:
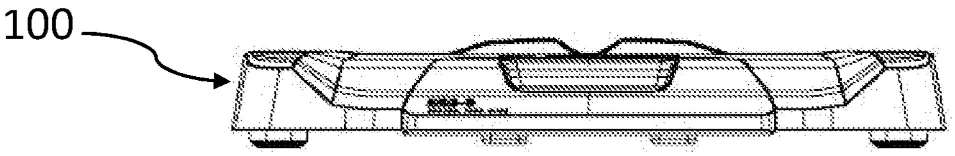
FIG. 4 is an end view of the spinal segmentation board assembly 100.
Figure 5:
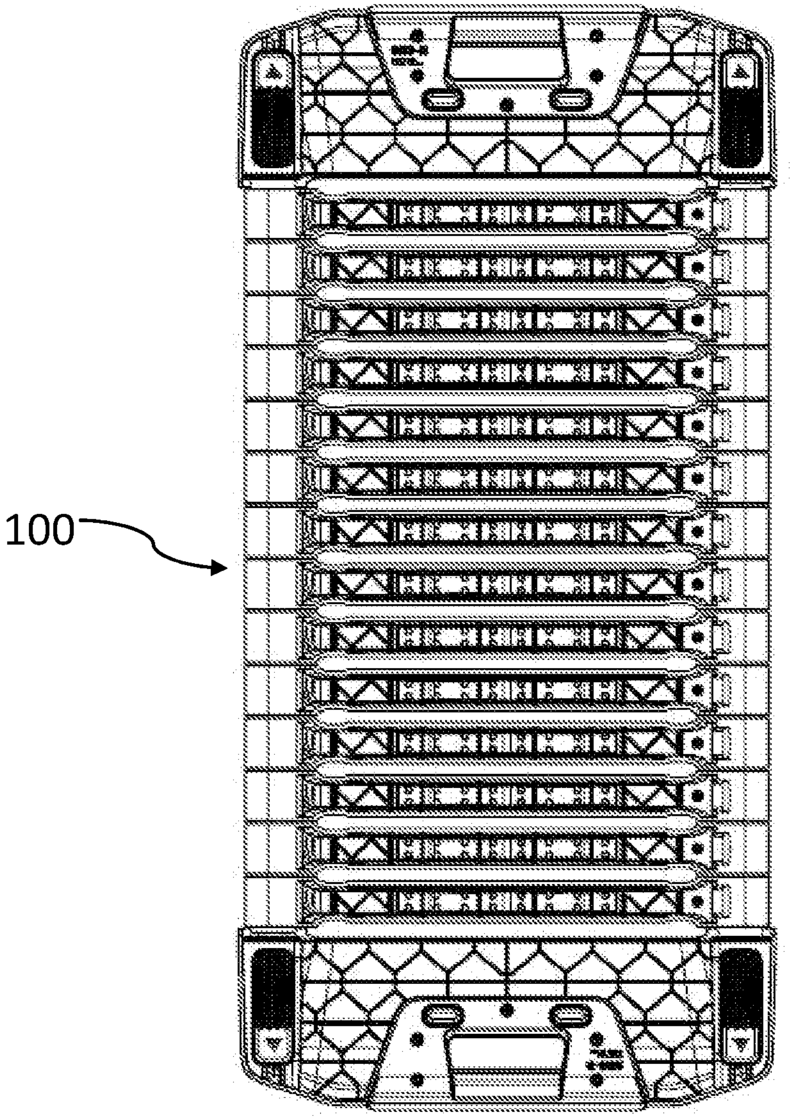
FIG. 5 is an underside view of the spinal segmentation board assembly 100.
Figure 6:
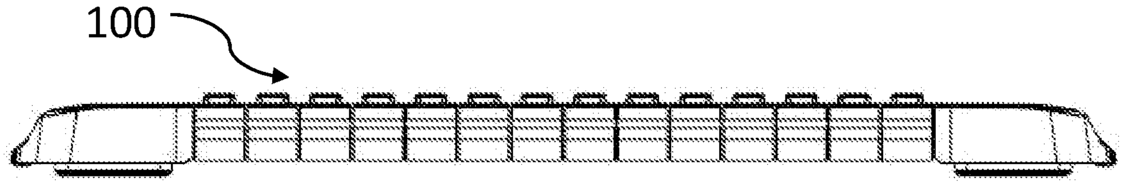
FIG. 6 is a side view of the spinal segmentation board assembly 100.
Figure 7:
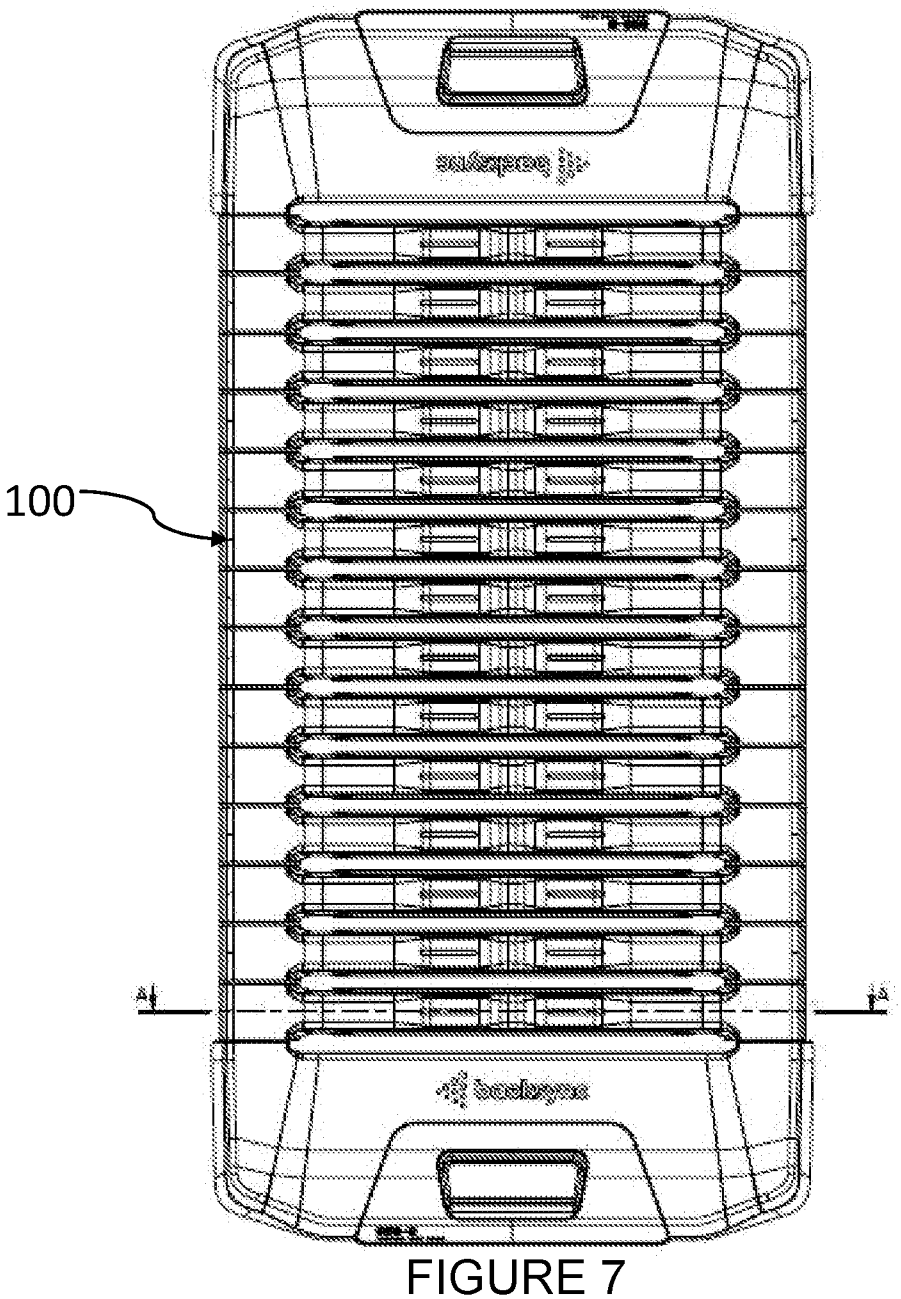
FIG. 7 is a top view of the spinal segmentation board assembly 100 with section A-A.
Figure 8:
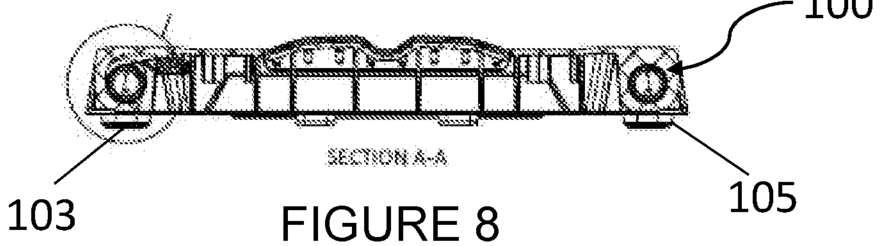
FIG. 8 is a sectional view along Section A-A shown in FIG. 7.
Figure 9:
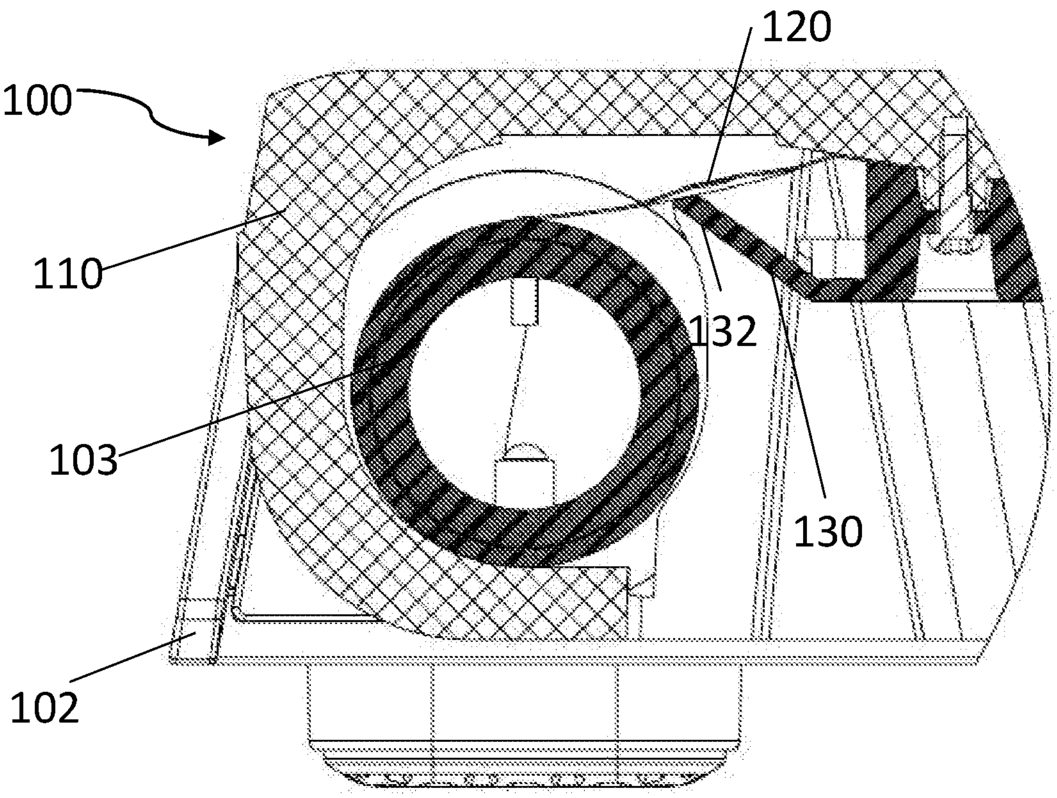
FIG. 9 is an enlarged sectional view of inset B shown in FIG. 8 in an initial raised configuration.
Figure 10:
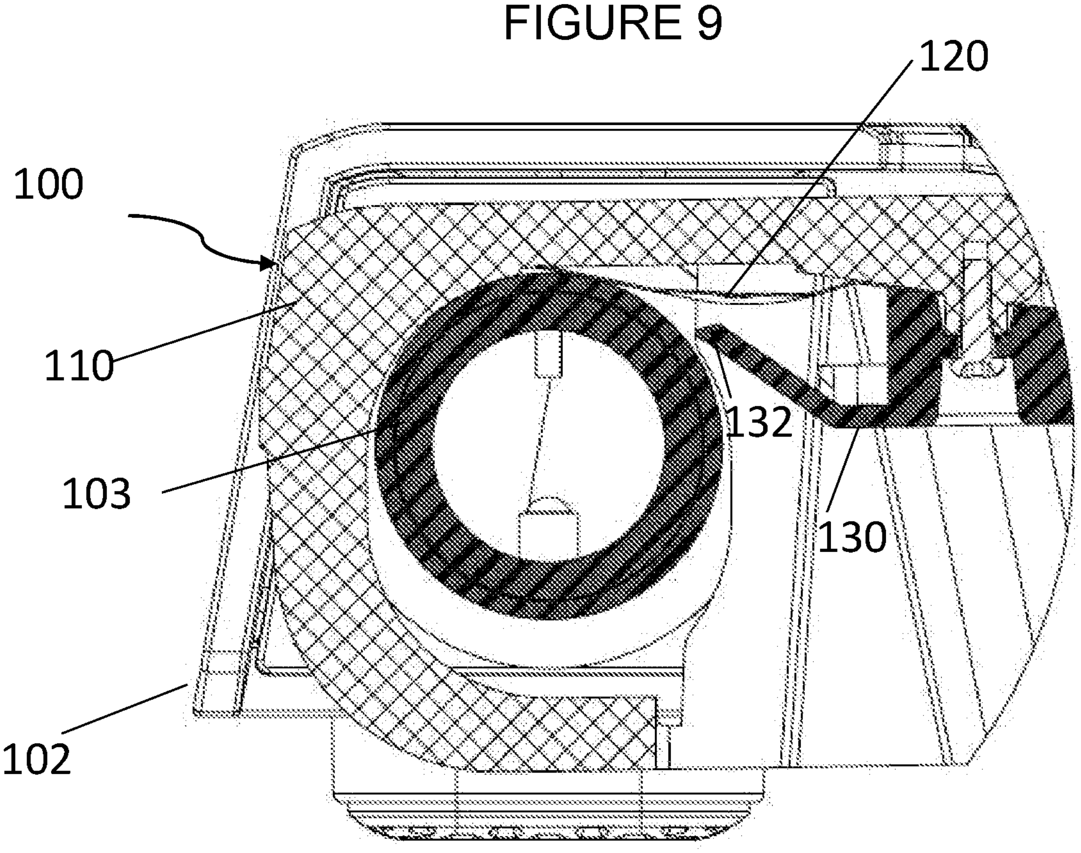
FIG. 10 is an enlarged sectional view of inset B shown in FIG. 8 in a pressed or lowered configuration.
Figure 12:
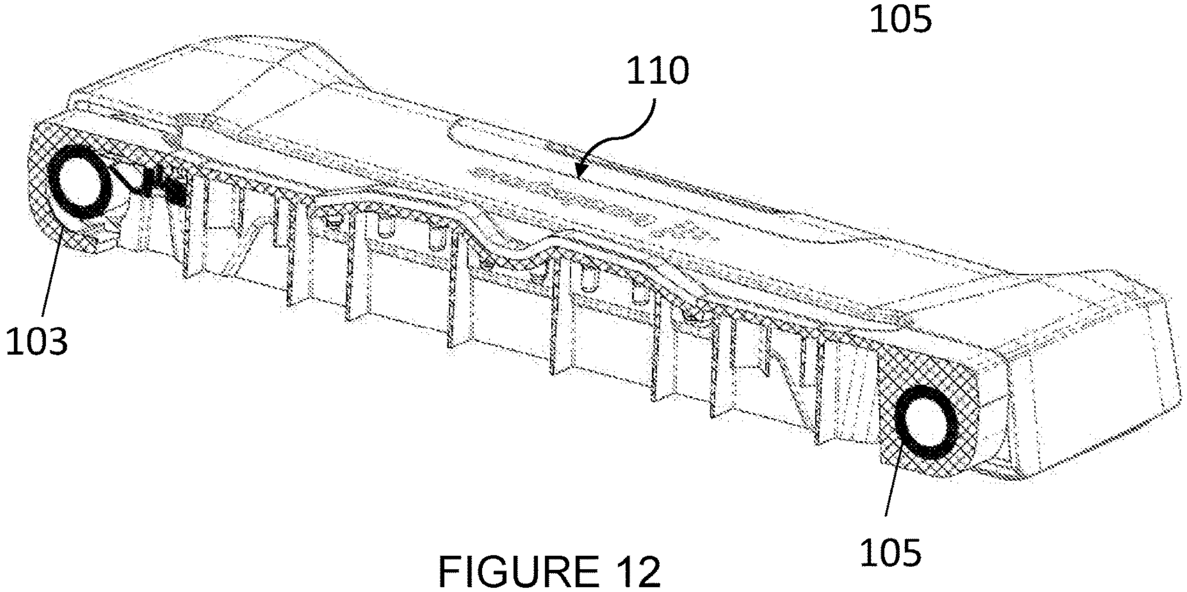
FIG. 12 is an isolated view of a back supporting member 110 in a pressed or lowered configuration.

FIGS. 1 to 12 illustrate a portable spinal segmentation board assembly 100 for assistance with improving a user's spinal posture. The segmentation board assembly 100 is generally rectangular in shape with a length extending between two ends 101 and 103 wherein each end is formed by respective first and second end members 102 and 104. The segmentation board assembly 100 comprises twelve independently movable back supporting members 110 that extend across the length of the segmentation board assembly 100. However, it should be understood that, the number of such back supporting members 110 is not limiting. Each of the twelve back supporting members 110 is elongate and positioned to be contiguously located with respect to the vertebrae in the user's upper back region (which includes the user's lumbar and thoracic region) during use. Each of the back supporting members 110 comprises a lumbar receiving surface extending between the two ends of the back supporting member 110 and the lumbar supporting surface that receives the user's back comprises a raised profile along a central location with a recessed or scooped out section 107 which is configured to accommodate a dorsal portion of the user's vertebral column.

As will be evident in the foregoing sections, each of the back supporting members 110 is resiliently biased to oppose a pushing force applied by the user's back. In particular, during use, the user would need to apply a pushing force by pushing one or more of the vertebrae (in the user's upper back region into the scooped sections 107) towards one or more of the back supporting members 110 to overcome the biasing force applied by each of the back supporting members 110. Each of the back supporting member 110 is independently movable thereby allowing the user to segment each of their twelve vertebrae by only applying enough force using one of the vertebrae at a given time to push one back supporting member at a time which ultimately allows each vertebra to be segmented from each other.

Figure 11:
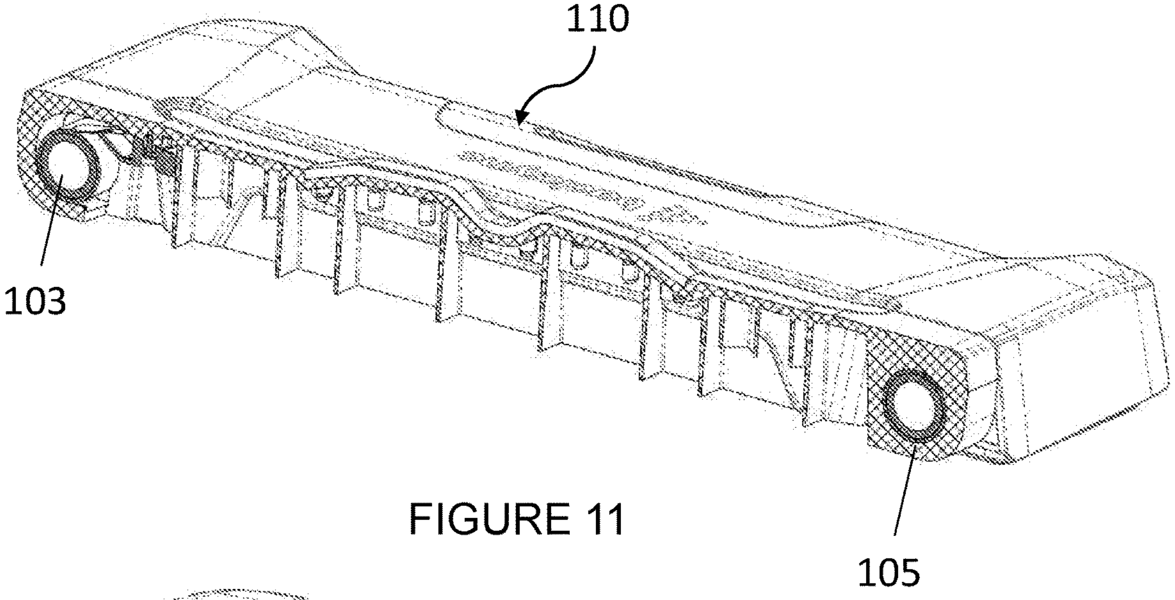
FIG. 11 is an isolated view of a back supporting member 110 in an initial raised configuration.
Figure 11A:
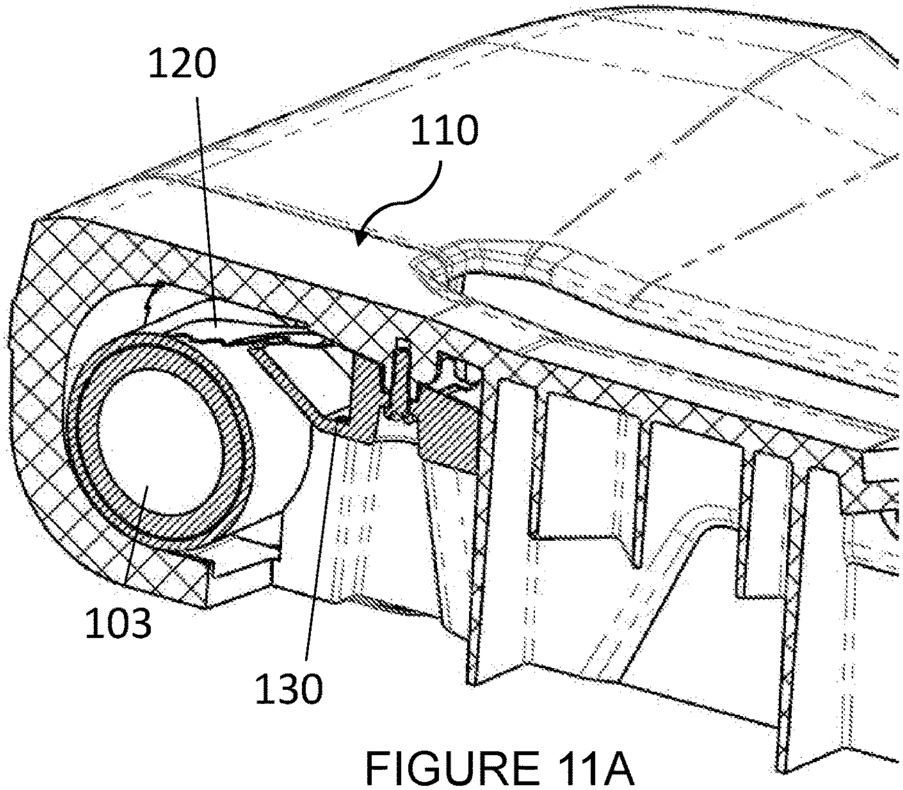
FIG. 11A is an enlarged isolated view of the back supporting member 110 in an initial raised configuration shown in FIG. 11.
Figure 12A:
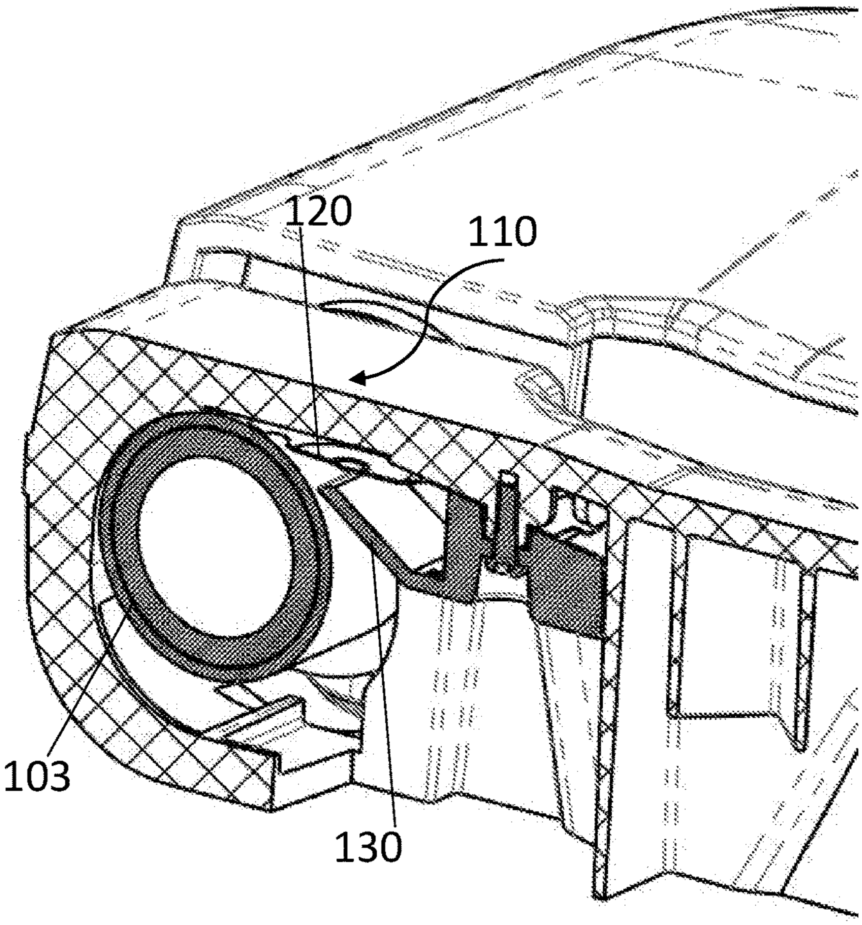
FIG. 12A is an enlarged isolated view of the back supporting member 110 in a pressed or lowered configuration shown in FIG. 11.
Figure 13:
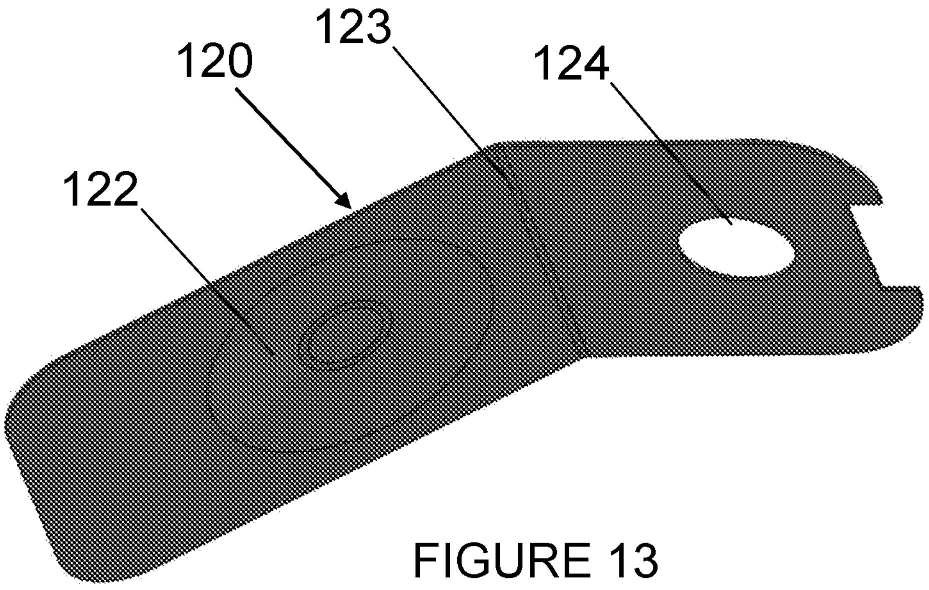
FIG. 13 is an isolated view of the tactile member 120.

Importantly, each back supporting member 110 is operatively linked with a corresponding underlying tactile member 120 (isolated view shown in FIG. 13 and other views shown in FIGS. 9 to 12) located along an underside portion of said back supporting member 110. The tactile member 120 comprises a tactile dome 122 which gets deflected (and emits a clicking sound) due to the downward movement of the pushing force applied by the user's lumbar region on one or more of the back supporting members 110. The tactile member 120 is a flat and elongate piece of metal with a first end of the tactile member 120 being fastened to an underside portion of the back supporting member 110 by a screw fastener which sandwiches the tactile member 120 between the dome engagement member 130 and the back supporting portion 110. The first end of the tactile member 120 is provided with an appropriately sized screw hole 124 for receiving the screw fastener. The tactile member 120 is also bent in an in-use downwardly direction along fold line 123 to apply a resilient bias on at least a part of the tactile member 120. The tactile member 120 is biased in a generally downward direction and engages with an upper part of the hollow tube 103 best shown in FIGS. 11A and 12A. Importantly, the second end of the tactile member 120 is not fastened to any particular part of the hollow tube 103 but instead merely lies contiguously in movable engagement with the upper portion of the hollow tube 103. The working of the dome engagement member 130 has been explained in detail in the foregoing sections. The pushing of each back supporting member 110 results in movement of said supporting member from an initial raised configuration (See FIGS. 9, 11 and 11A) to a lowered configuration (See FIGS. 10, 12 and 12A) wherein the movement results in the first clicking sound emitted by the deflection of the tactile dome 120 underlying tactile member 120 because the downward force applied by the user on the user's vertebral column on the back supporting member 110 results in corresponding downward movement of the dome engagement member 130. The dome engagement member comprises an in-use upwardly extending dome engagement arm 132 which is in contact with the dome portion of the tactile member 120 when the back supporting member is in an initially raised position. As the back supporting member 110 is pushed downwards the dome engagement arm 132 becomes spaced away from the dome 122 thereby allowing the dome 120 to emit a clicking sound as the dome 120 extends downwardly undergoing deflection (see FIG. 10).

Each tactile member 120 is formed from a thin foil of metal that is held under tension and located under its corresponding back supporting member 110 as shown most clearly in FIGS. 9 to 12. When the pushing force being applied on each back supporting member 110 is withdrawn, the tension in the tactile member 120 pushes the back supporting member 110 to its initial configuration. As a result, the tactile member 120 functions to apply a resilient bias and opposes any pushing force applied on the upper outer surface of each back supporting member 110. During the withdrawal of the force, the tactile dome 122 also undergoes a deflection back to its original position resulting in a second clicking sound.

Furthermore, the dome engagement member 130 is positioned below each of the tactile dome portions 122 of the tactile member 120. The movement of each of the back supporting member 110 from the initial configuration to the lowered configuration results in separation between the tactile dome portion and the dome engagement member 130 resulting in the dome portion being deflected accompanied by a clicking sound. The dome engagement member 130 is fastened to an underside portion of the back supporting member 110 using a screw fastener which results in the dome engagement member 130 moving away from the dome portion 122 when the back supporting member 110 is moved from the initial configuration to the lowered configuration upon being pushed by the user as has been previously explained.

Each of the twelve back supporting members 110 are mounted transversely between the two end members 102 and 104 as previously described. Two spaced apart frame members in the form of hollow tubes 103 and 105 extend between the end members 102 and 104 to allow the back supporting members 110 to be mounted upon and across these hollow tubes 103 and 105. Each back supporting member 110 at a first end is rotatably mounted relative to one of the frame members, namely hollow tube 105. At the second end the back supporting member 100 can be movably mounted upon the second frame member, namely the hollow tube 103 to be moved between the initial raised configuration and the lowered configuration upon receiving the pushing force applied by the user's lumbar region. The pushing of the back supporting member 110 to move the second end of the back supporting member 110 towards the second frame member, the hollow tube 103 as the back supporting member 110 is lowered.

Each back supporting member 110 comprises side walls that depend downwardly from the upper lumbar receiving surface. At either end of the back supporting member 110 there are side walls provided. The side wall located at the second end is provided with a visual indicator in the form of a line. In the neutral or initial (non-lowered) configuration a straight line runs across the side walls for each of the back supporting members 110. When any one of the back supporting members 110 is lowered the line on the side walls appears broken and easily indicates the user's ability to use each individual vertebra to push a back supporting member 110 from the initial into the lowered configuration.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art

The invention claimed is:

1. An apparatus for spinal segmentation of a user's spine, the apparatus comprising:

a board assembly having a length extending between two ends and comprising a plurality of independently movable back supporting members arranged transversely across the length, each back supporting member being positioned for receiving separate regions of the user's lumbar region during use;

each back supporting member being operatively linked with a corresponding underlying tactile member located along an underside portion of said back supporting member such that when a pushing force is applied by the user's lumbar region on one or more of the back supporting members, movement of said supporting member from an initial raised configuration to a lowered configuration occurs, wherein the movement results in a first clicking sound emitted by the underlying tactile member.

2. An apparatus in accordance with claim 1, wherein each of the back supporting members is resiliently biased by a biasing arrangement to return to the initial raised configuration when the pushing force is withdrawn.

3. An apparatus in accordance with claim 2, wherein the biased movement of the back supporting member from the lowered configuration to the initial configuration results in a second clicking sound emitted by the underlying tactile member.

4. An apparatus in accordance with claim 2, wherein the tactile member is resiliently biased to resist the in-use downward movement of the back supporting member.

5. An apparatus in accordance with claim 1, wherein the board assembly comprises a first end member positioned at the first end and a second end member positioned at the second end with the plurality of back supporting members being positioned in between the first and second end members.

6. An apparatus in accordance with claim 5, further comprising at least two spaced apart frame members, each frame member being substantially elongate and extending between the first end member and the second end member wherein the back supporting members are mounted upon and across the spaced apart frame members.

7. An apparatus in accordance with claim 6, wherein each back supporting member at a first end is rotatably or pivotally mounted relative to one of the frame members so that the second end of the back supporting member can be moved between the initial raised configuration and the lowered configuration when receiving a pushing force applied by the user's lumbar region on the back supporting member to move the second end of the back supporting member towards the second frame member as the back supporting member is lowered.

8. An apparatus in accordance with claim 1, wherein the underlying tactile member comprises a tactile dome portion operatively linked with an underlying dome engagement member positioned below the tactile dome portion whereby movement from the initial configuration to the lowered configuration results in separation between the tactile dome portion and the dome engagement member resulting in the dome portion being moved accompanied by a clicking sound.

9. An apparatus in accordance with claim 8, wherein the tactile member is sandwiched between the back supporting member and the dome engagement member with a fastening arrangement being provided to fasten the back supporting member, tactile member and the dome engagement member to each other.

10. An apparatus in accordance with claim 9, wherein the dome engagement member comprises a hollow configuration allow the clicking sound emitted by the tactile dome portion to be reflected towards the user.

11. An apparatus in accordance with claim 1, wherein each back supporting member comprises a downwardly dependent side wall extending from the lumbar receiving surface wherein the side wall comprises visual indicia to indicate relative movement between the independently movable lumbar supporting regions.

12. An apparatus in accordance with claim 11, wherein a side wall depending from the second end of the back supporting member comprises said visual indica.

13. An apparatus in accordance with claim 1, wherein the tactile member comprises a thin metallic foil with the tactile dome portion being embossed into the metallic foil.

14. An apparatus in accordance with claim 1, wherein each of the back supporting members comprises a lumbar receiving surface extending between the two ends of the back supporting member and wherein the lumbar supporting surface comprises a raised profile along a central location between the two ends of the back supporting member.

15. An apparatus in accordance with claim 1, wherein the board assembly comprises five to fourteen back supporting members and wherein each back supporting member is positioned to be substantially aligned with vertebrae in the user's back region during use.

* * * * *